United States Patent
Jeong et al.

(10) Patent No.: US 12,424,707 B2
(45) Date of Patent: Sep. 23, 2025

(54) SEPARATOR FOR LITHIUM SECONDARY BATTERY, MANUFACTURING METHOD THEREFOR, AND LITHIUM SECONDARY BATTERY COMPRISING SAME

(71) Applicant: LG ENERGY SOLUTION, LTD., Seoul (KR)

(72) Inventors: So-Mi Jeong, Daejeon (KR); Min-Ji Kim, Daejeon (KR); Da-Kyung Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 543 days.

(21) Appl. No.: 17/801,824

(22) PCT Filed: Mar. 31, 2021

(86) PCT No.: PCT/KR2021/004014
§ 371 (c)(1),
(2) Date: Aug. 24, 2022

(87) PCT Pub. No.: WO2021/201606
PCT Pub. Date: Oct. 7, 2021

(65) Prior Publication Data
US 2023/0090568 A1    Mar. 23, 2023

(30) Foreign Application Priority Data

Apr. 3, 2020 (KR) .................. 10-2020-0041002

(51) Int. Cl.
*H01M 50/48* (2021.01)
*H01M 50/46* (2021.01)
*H01M 50/491* (2021.01)

(52) U.S. Cl.
CPC ........... *H01M 50/48* (2021.01); *H01M 50/46* (2021.01); *H01M 50/491* (2021.01)

(58) Field of Classification Search
None
See application file for complete search history.

(56) References Cited

U.S. PATENT DOCUMENTS

| | | | | |
|---|---|---|---|---|
| 4,286,030 | A * | 8/1981 | Moore | H01M 50/403 156/335 |
| 2013/0323592 | A1 | 12/2013 | Lee et al. | |
| 2014/0045096 | A1 * | 2/2014 | Berger | H01M 8/1065 204/279 |
| 2015/0325829 | A1 | 11/2015 | Lee | |
| 2017/0133654 | A1 * | 5/2017 | Cho | C09D 179/08 |
| 2018/0083259 | A1 | 3/2018 | Ho et al. | |
| 2019/0165349 | A1 | 5/2019 | Kim et al. | |
| 2019/0245183 | A1 | 8/2019 | Jeong et al. | |
| 2019/0355953 | A1 | 11/2019 | Nam et al. | |
| 2020/0358064 | A1 | 11/2020 | Kwon et al. | |
| 2023/0098650 | A1 * | 3/2023 | Jeong | H01M 10/052 429/144 |

FOREIGN PATENT DOCUMENTS

| | | |
|---|---|---|
| CN | 108493389 A | 9/2018 |
| CN | 109167007 A | 1/2019 |
| CN | 109314207 A | 2/2019 |
| JP | 10-31991 A | 2/1998 |
| JP | 2005-38793 A | 2/2005 |
| JP | 2010-232202 A | 10/2010 |
| JP | 4827117 B2 | 11/2011 |
| JP | 2013-235810 A | 11/2013 |
| JP | 2019-102453 A | 6/2019 |
| JP | 2019-536242 A | 12/2019 |
| KR | 10-2012-0085371 A | 8/2012 |
| KR | 10-1267283 B1 | 5/2013 |
| KR | 10-2013-0070272 A | 6/2013 |
| KR | 10-2013-0134917 A | 12/2013 |
| KR | 10-2015-0125700 A | 11/2015 |
| KR | 10-2017-0053495 A | 5/2017 |
| KR | 10-1743694 B1 | 6/2017 |
| KR | 10-2019-0039836 A | 4/2019 |
| KR | 10-2019-0066760 A | 6/2019 |
| KR | 10-2019-0139509 A | 12/2019 |

OTHER PUBLICATIONS

Extended European Search Report for European Application No. 21779910.5, dated Aug. 9, 2024.
Peng et al., "Three-Dimensional Coating Layer Modified Polyolefin Ceramic-Coated Separators to Enhance the Safety Performance of Lithium-Ion Batteries," Journal of the Electrochemical Society, vol. 166, No. 10, Jun. 18, 2019, pp. A2111-A2120.
International Search Report (PCT/ISA/210) issued in PCT/KR2021/004014 mailed on Jul. 19, 2021.

* cited by examiner

*Primary Examiner* — Alix E Eggerding
(74) *Attorney, Agent, or Firm* — Birch, Stewart, Kolasch & Birch, LLP

(57) ABSTRACT

A separator for a lithium secondary battery, a method for manufacturing the same, and a lithium secondary battery including the separator, where the separator includes a porous polymer substrate having a plurality of pores, and a porous coating layer on at least one surface of the porous polymer substrate. The porous coating layer includes a plurality of inorganic particles and a binder polymer. The binder polymer includes a thermosetting phenolic resin having at least one hydroxyl group and at least one aromatic group. When the separator is exposed to high temperature, due to ignition or the like, the thermosetting phenolic resin in the porous coating layer is thermally cured to form a network structure by virtue of the structural characteristics of the separator. As a result, the separator has improved heat resistance as compared to the conventional separators and shows high adhesion to an electrode.

15 Claims, No Drawings

SEPARATOR FOR LITHIUM SECONDARY BATTERY, MANUFACTURING METHOD THEREFOR, AND LITHIUM SECONDARY BATTERY COMPRISING SAME

TECHNICAL FIELD

The present disclosure relates to a separator for a lithium secondary battery, a method for manufacturing the same, and a lithium secondary battery including the same.

The present application claims priority to Korean Patent Application No. 10-2020-0041002 filed on Apr. 3, 2020 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such secondary batteries have been produced from many production companies, safety characteristics thereof show different signs. Evaluation and securement of safety of such secondary batteries are very important. The most important consideration is that secondary batteries should not damage users upon their malfunction. For this purpose, safety standards strictly control ignition and smoke emission in secondary batteries. With regard to safety characteristics of secondary batteries, there is great concern about explosion when a secondary battery is overheated to cause thermal runaway or perforation of a separator.

Such a separator prevents a short-circuit between a cathode and an anode, and provides a lithium-ion transport channel. Therefore, the separator is an important factor affecting the safety and output characteristics of a battery. However, a polyolefin-based porous polymer substrate used conventionally as a separator for an electrochemical device shows a severe heat shrinking behavior at a temperature of 130° C. or higher due to its material property and a characteristic during its manufacturing process, including orientation, thereby causing a short-circuit between a cathode and an anode.

Under these circumstances, there has been an attempt to apply a porous coating layer including inorganic particles and a thermoplastic binder polymer to the porous polymer substrate in order to increase the heat resistance. When forming such a porous coating layer, heat resistance may be improved as compared to the porous polymer substrate used alone. However, when the separator is exposed to a high-temperature environment higher than the melting point of the binder polymer, improvement of thermal safety is limited.

Meanwhile, high adhesion is also required between the porous coating layer and an electrode.

DISCLOSURE

Technical Problem

The present disclosure is designed to solve the problems of the related art, and therefore the present disclosure is directed to providing a separator for a lithium secondary battery which has improved heat resistance and shows high adhesion to an electrode.

The present disclosure is also directed to providing a method for manufacturing the separator for a lithium secondary battery having the above-mentioned characteristics.

In addition, the present disclosure is directed to providing a lithium secondary battery including the separator having the above-mentioned characteristics.

Technical Solution

In one aspect of the present disclosure, there is provided a separator for a lithium secondary battery according to any one of the following embodiments.

According to the first embodiment, there is provided a separator for a lithium secondary battery, including:

a porous polymer substrate having a plurality of pores; and a porous coating layer on at least one surface of the porous polymer substrate and wherein the porous coating layer includes a plurality of inorganic particles and a binder polymer, wherein the binder polymer includes a thermosetting phenolic resin having at least one hydroxyl group and at least one aromatic group.

According to the second embodiment, there is provided the separator for a lithium secondary battery as defined in the first embodiment, wherein the thermosetting phenolic resin includes at least one of a novolac-containing phenol resin represented by the following Chemical Formula 1 and a resol type resol-containing phenol resin represented by the following Chemical Formula 2:

[Chemical Formula 1]

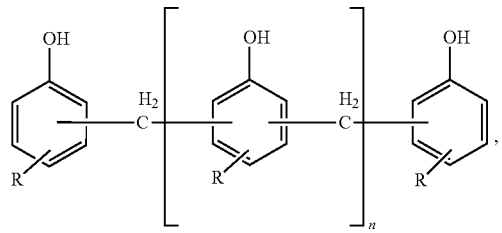

wherein n is an integer of 1 or more, and R represents any one of H, $C_1$-$C_{100}$ alkyl, alkoxy and alkenyl groups, wherein the $C_1$-$C_{100}$ alkyl, alkoxy and alkenyl groups are optionally substituted,

[Chemical Formula 2]

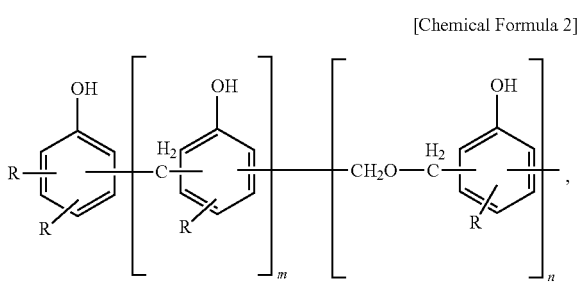

wherein each of n and m is an integer of 1 or more, and R represents any one of H, $C_1$-$C_{100}$ alkyl, alkoxy and alkenyl groups, wherein the $C_1$-$C_{100}$ alkyl, alkoxy and alkenyl groups are optionally substituted.

According to the third embodiment, there is provided the separator for a lithium secondary battery as defined in the first or the second embodiment, wherein the thermosetting phenolic resin is thermally cured at 120-200° C.

According to the fourth embodiment, there is provided the separator for a lithium secondary battery as defined in any one of the first to the third embodiments, wherein the thermosetting phenolic resin is a phenol-formaldehyde resin.

According to the fifth embodiment, there is provided the separator for a lithium secondary battery as defined in any one of the first to the fourth embodiments, wherein an amount of the thermosetting phenolic resin is 0.1 wt % to 20 wt % based on 100 wt % of an amount of the inorganic particles.

According to the sixth embodiment, there is provided the separator for a lithium secondary battery as defined in any one of the first to the fifth embodiments, wherein the binder polymer further includes a non-phenolic resin in an amount of 0.1 wt % to 50 wt % based on 100 wt % of an amount of the inorganic particles.

According to the seventh embodiment, there is provided the separator for a lithium secondary battery as defined in any one of the first to the sixth embodiments, wherein the porous polymer substrate has a thickness of 1-20 μm, and the thickness of the porous coating layer is 0.5-20 μm based on single surface coating.

In another aspect of the present disclosure, there is provided a method for manufacturing a separator according to any one of the following embodiments.

According to the eighth embodiment, there is provided a method for manufacturing a separator for a lithium secondary battery, including the steps of:
(S1) preparing an inorganic particle dispersion by dispersing inorganic particles in a first solvent, and dissolving a thermosetting phenolic resin having at least one hydroxyl group and at least one aromatic ring in the inorganic particle dispersion to form a slurry; and
(S2) coating the slurry including the inorganic particle dispersion on at least one surface of a porous polymer substrate, followed by and drying the slurry after coating to form a porous coating layer.

According to the ninth embodiment of the present disclosure, there is provided the method for manufacturing a separator for a lithium secondary battery as defined in the eighth embodiment, which further includes a step of mixing the inorganic particle dispersion of step (S1) with a polymer solution including a non-phenolic resin dissolved in a second solvent before step (S2).

According to the tenth embodiment of the present disclosure, there is provided the method for manufacturing a separator for a lithium secondary battery as defined in the ninth embodiment, wherein each of the first solvent and the second solvent independently includes at least one selected from the group consisting of water, C2-C5 alcohols, acetone, tetrahydrofuran, methylene chloride, chloroform, dimethyl formamide, N-methyl-2-pyrrolidone, methyl ethyl ketone and cyclohexane.

According to the eleventh embodiment of the present disclosure, there is provided the method for manufacturing a separator for a lithium secondary battery as defined in any one of the eighth to the tenth embodiments, wherein the inorganic particle dispersion further includes a dispersing agent.

According to the twelfth embodiment of the present disclosure, there is provided the method for manufacturing a separator for a lithium secondary battery as defined in any one of the eighth to the eleventh embodiments, wherein the thermosetting phenolic resin includes at least one of a novolac-containing phenol resin represented by the following Chemical Formula 1 and a resol-containing phenol resin represented by the following Chemical Formula 2:

[Chemical Formula 1]

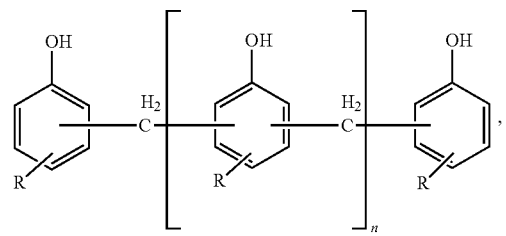

wherein n is an integer of 1 or more, and R represents any one of H, $C_1$-$C_{100}$ alkyl, alkoxy and alkenyl groups,
wherein the $C_1$-$C_{100}$ alkyl, alkoxy and alkenyl groups are optionally substituted,

[Chemical Formula 2]

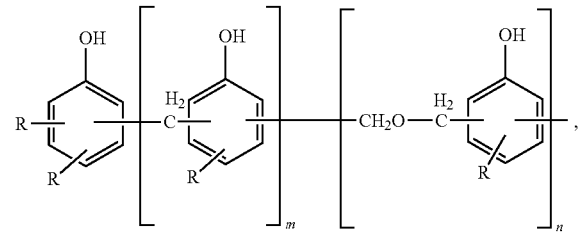

wherein each of n and m is an integer of 1 or more, and R represents any one of H, $C_1$-$C_{100}$ alkyl, alkoxy and alkenyl groups,
wherein the $C_1$-$C_{100}$ alkyl, alkoxy and alkenyl groups are optionally substituted.

According to the thirteenth embodiment of the present disclosure, there is provided the method for manufacturing a separator for a lithium secondary battery as defined in any one of the eighth to the twelfth embodiments, wherein the thermosetting phenolic resin is thermally cured at 120-200° C.

According to the fourteenth embodiment of the present disclosure, there is provided the method for manufacturing a separator for a lithium secondary battery as defined in any one of the eighth to the thirteenth embodiments, wherein an amount of the thermosetting phenolic resin is 0.1 wt % to 20 wt % based on 100 wt % of an amount of the inorganic particles.

In still another aspect of the present disclosure, there is provided a lithium secondary battery including a cathode, an anode and a separator interposed between the cathode and the anode, wherein the separator is the same as defined in any one of the above-described embodiments.

Advantageous Effects

The separator for a lithium secondary battery according to an embodiment of the present disclosure includes a porous coating layer containing a plurality of inorganic particles and a binder polymer, wherein the binder polymer includes a thermosetting phenolic resin having at least one hydroxyl group and aromatic ring. The thermosetting phenolic resin having such a structure functions as a dispersing agent in slurry for forming a porous coating layer as well as functions as a binder polymer for fixing the inorganic particles. Therefore, the inorganic particles are mixed well with the binder polymer in the slurry, and thus the adhesion between an electrode and the porous coating layer is maintained well, even when using no dispersing agent or using a reduced amount of dispersing agent. In addition, it is possible to reduce the content of the dispersing agent and to increase the content of the binder polymer, and thus to improve the adhesion to the electrode.

Meanwhile, when an electrochemical device including the separator is exposed to high temperature, due to ignition or the like, the thermosetting phenolic resin is thermally cured to form a network structure. As a result, it is possible to provide a separator with reinforced heat resistance and improved thermal safety.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes or comprises an element' does not preclude the presence of any additional elements but means that the part may further include the other elements, unless otherwise stated.

In general, a lithium secondary battery uses a porous polymer substrate as a separator. Such a porous polymer substrate may include a non-woven web substrate including polymer fibers and a film substrate made of a film obtained by melt extrusion of a polymer. Such polymer substrates, particularly, film substrates show a heat shrinking behavior undesirably. Therefore, in order to improve the heat resistance of a separator, a porous coating layer including a plurality of inorganic particles and a binder polymer has been introduced to at least one surface of the porous polymer substrate. When the porous coating layer is formed as mentioned above, it is possible to improve the heat resistance of the separator as compared to the porous polymer substrate used alone.

A thermoplastic fluorinated binder polymer has been used largely as a binder polymer. When the separator is exposed to a high-temperature environment higher than the melting point of the binder polymer, improvement of thermal safety is limited. In addition, high adhesion between the porous coating layer and an electrode is required to realize the performance of the lithium secondary battery sufficiently.

The present inventors have conductive intensive studies to solve the above-mentioned problems. Therefore, the present disclosure is directed to providing a separator, which includes a porous coating layer showing improved heat resistance, when an electrochemical device including the separator is exposed to high temperature, due to ignition, or the like, and has high adhesion to an electrode.

According to the first embodiment, there is provided a separator for a lithium secondary battery, including:

a porous polymer substrate having a plurality of pores; and a porous coating layer formed on at least one surface of the porous polymer substrate and including a plurality of inorganic particles and a binder polymer, wherein the binder polymer includes a thermosetting phenolic resin having at least one hydroxyl group and aromatic group.

In the separator according to an embodiment of the present disclosure, the thermosetting phenolic resin is thermally cured to form a network structure, when the separator is exposed to high temperature in an abnormal environment. Herein, the network structure refers to a structure formed by the thermal curing of the thermosetting phenolic resin, wherein the network structure may be a three-dimensional network structure.

When the thermosetting phenolic resin in the porous coating layer undergoes a thermal curing reaction and forms a network structure at high temperature in an abnormal environment as mentioned above, it is possible to improve the heat resistance and dimensional stability, as compared to a separator using a thermoplastic polymer. In other words, when the network structure is formed by the thermal curing reaction, the inorganic particles may be retained firmly in the network structure up to a significantly high temperature.

[Thermosetting Phenolic Resin]

The thermosetting phenolic resin has at least one hydroxyl group and aromatic ring.

The thermosetting phenolic resin is thermally cured at high temperature to form a network structure. Particularly, the thermosetting phenolic resin may be thermally cured at a high temperature of 120° C. or higher, particularly at a high temperature of 120-200° C.

Meanwhile, the thermosetting phenolic resin having at least one hydroxyl group and aromatic ring may function as a dispersing agent in the slurry for forming a porous coating layer. In this manner, it is possible to disperse inorganic particles more easily in the slurry for forming a porous coating layer, and thus another dispersing agent may not be used or use thereof may be reduced.

The thermosetting phenolic resin may include at least one of a novolac-type phenol resin represented by the following Chemical Formula 1 and a resol-type phenol resin represented by the following Chemical Formula 2, and may further include a modified phenol resin. Particularly, any thermosetting phenolic resin obtained from aldehyde condensation of phenol and derivatives thereof may be used.

Herein, Chemical Formula 1 is the same as represented hereinafter.

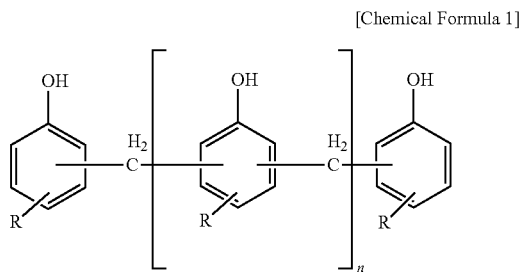

[Chemical Formula 1]

wherein n is an integer of 1 or more, and R represents any one of H and optionally substituted C1-C100 alkyl, alkoxy and alkenyl groups. Herein, the number of carbon atoms may be 1-100 or less, 1-50 or less, 1-30 or less, or 1-10 or less.

As used herein, 'novolac-type phenol resin' may be obtained by the reaction of a phenol compound with an aldehyde compound in the presence of an acidic catalyst. Since the novolac-type phenol resin has a phenolic hydroxyl group, it is soluble in alkali. However, when the novolac-type phenol resin has an excessively high molecular weight, its solubility is reduced.

Since the novolac-type resin has little methylol group reactive to curing, it is possible to form a cured product having a three-dimensional structure, when it is heated after adding a curing agent, such as hexamethylene tetraamine (($CH_2)_6N_4$), thereto.

The novolac-type phenol resin may be present as an ortho- or para-binding. According to an embodiment of the present disclosure, the novolac-type phenol resin may have a ratio of ortho-binding/para-binding of less than 0.2, particularly less than 0.1.

According to an embodiment of the present disclosure, the novolac-type phenol resin may have at least two kinds of novolac-type phenol resins having a different ratio of ortho-binding/para-binding. Herein, when using a high-para novolac-type phenol resin having a larger amount of para-binding as compared to ortho-binding, curing occurs more rapidly at high temperature so that the separator may be provided with more improved safety.

The novolac-type phenol resin preferably has a weight average molecular weight (Mw) of 1,000-4,000 and a polydispersity (Mw/Mn, wherein Mn is a number average molecular weight) of 2.0 or less. A novolac-type phenol resin having a weight average molecular weight within the above-defined range is advantageous in terms of ensuring heat resistance and flowability during the preparation of slurry and forming a thin film-type porous coating layer. Meanwhile, a novolac-type phenol resin having a polydispersity of 2.0 or less is more advantageous in terms of improvement of dispersibility of inorganic particles. The novolac-type phenol resin may have an equivalent of hydroxyl groups of 100-200 g/eq.

Chemical Formula 2 is the same as represented hereinafter.

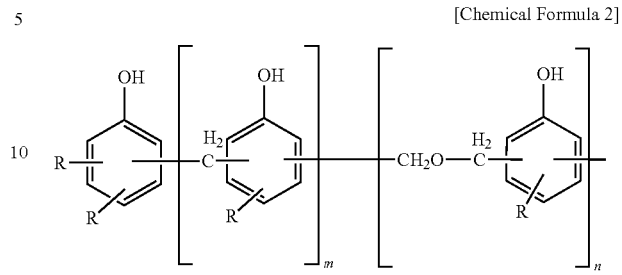

[Chemical Formula 2]

wherein each of n and m is an integer of 1 or more, and R represents any one of H and optionally substituted C1-C100 alkyl, alkoxy and alkenyl groups.

As used herein, 'resol-type phenol resin' may be obtained by reacting a phenol compound with an aldehyde compound in the presence of a metal catalyst. The resol-type phenol resin has a hydroxyl group and reacts with the novolac-type phenol resin to form a crosslinked structure.

Herein, the metal catalyst may include manganese, magnesium, zinc, or the like. Particularly, the metal catalyst may be a metal acetate. For example, the metal catalyst may include manganese acetate, magnesium acetate and zinc acetate. Such metal catalysts may be used alone or in combination.

The resol-type phenol resin preferably has a weight average molecular weight of 420-1,500 and has a polydispersity (Mw/Mn, wherein Mn is a number average molecular weight) of 2.0 or less. A resol-type phenol resin having a weight average molecular weight within the above-defined range is advantageous in terms of ensuring heat resistance and flowability during the preparation of slurry and forming a thin film-type porous coating layer. Meanwhile, a resol-type phenol resin having a polydispersity of 2.0 or less is more advantageous in terms of improvement of dispersity of inorganic particles. The resol-type phenol resin may have an equivalent of hydroxyl groups of 100-200 g/eq.

Herein, weight average molecular weight may be determined by using gel permeation chromatography (GPC, PL GPC220, Agilent Technologies).

Particularly, determination of weight average molecular weight may be carried out under the following analysis conditions:

Column: PL MiniMixed B×2
Solvent: THF or DMF
Flow rate: 0.3 mL/min
Sample concentration: 2.0 mg/mL
Injection amount: 10 μL
Column temperature: 40° C.
Detector: Agilent RI detector
Standard: Polystyrene (corrected with tertiary function)
Data processing: ChemStation According to an embodiment of the present disclosure, the thermosetting phenolic resin may include 2,3,4-trihydroxybenzophenone, 2,4,6-trihydroxybenzophenone, 2,2'-tetrahydroxybenzophenone, 4,4'-tetrahydroxybenzophenone, 2,3,4,3'-tetrahydroxybenzophenone, 2,3,4,4'-tetrahydroxybenzophenone, 2,3,4,2'-tetrahydroxy 4'-methylbenzophenone, 2,3,4,4'-tetrahydroxy 3'-methoxybenzophenen, 2,3,4,2'-pentahydroxybenzophenone, 2,3,4,6'-pentahydroxybenzophenone, 2,4,6,3'-hexahydroxybenzophenone, 2,4,6,4'-hexahydroxybenzophenone, 2,4,6,5'-hexahydroxybenzophenone, 3,4,5,3'-hexahydroxybenzophenone, 3,4,5,4'-hexahydroxybenzophenone, 3,4,5,5'- hexahydroxybenzophenone, bis(2,4-dihydroxyphenyl)methane, bis(p-hydroxyphenyl)methane, tri(p-hydroxyphenyl)methane, 1,1,1-tri(p-hydroxyphenyl)ethane, bis(2,3,4-trihydroxyphenyl)methane, 2,2-bis(2,3,4-trihydroxyphenyl)propane, 1,1,3-tris(2,5-dimethyl 4-hydroxyphenyl)-3-phenyl propane, 4,4'-[1-[4-[1-[4-hydroxyphenyl]-1-methylethyl]phenyl]ethydene]bisphenol, bis(2,5-dimethyl 4-hydroxyphenyl)-2-hydroxyphenylmethane, or the like. Such compounds may be used alone, or two or more of them may be used in combination to prepare a resin. For example, the thermosetting phenolic resin may be a phenol-formaldehyde resin.

According to an embodiment of the present disclosure, when the thermosetting phenolic resin is thermally cured under an abnormal high-temperature environment, it may form a network structure having a structure represented hereinafter.

For example, the network structure may be represented by the following Chemical Formula 3:

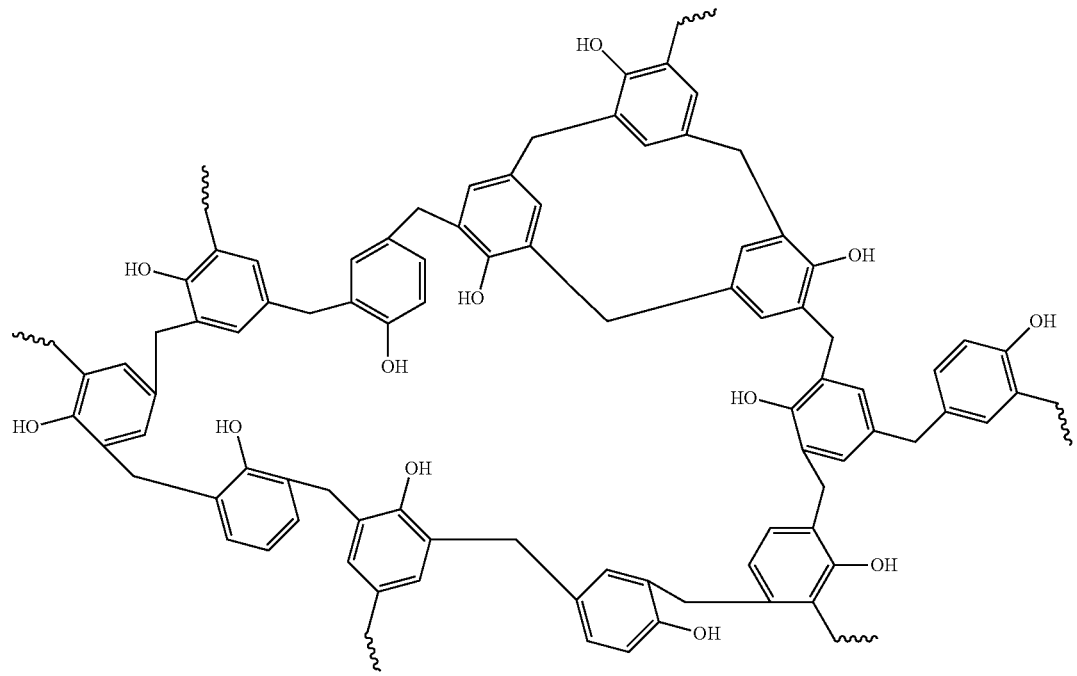

According to an embodiment of the present disclosure, once the thermosetting phenolic resin is thermally cured to form a network structure, the inorganic particles in the porous coating layer may be disposed in the network structure.

Herein, the content of the thermosetting phenolic resin may be particularly 0.1-20 wt %, and more particularly 0.5-15 wt %, based on 100 wt % of the content of the inorganic particles. Within the above defined range, it is possible to improve the heat resistance, while not causing a significant increase in the interfacial resistance between the porous polymer substrate and the porous coating layer.

[Inorganic Particles]

According to the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li$^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium-ion transportability or a combination thereof.

The inorganic particles having a dielectric constant of 5 or more may include any one selected from the group consisting of $Al_2O_3$, $SiO_2$, $ZrO_2$, AlOOH, $TiO_2$, $BaTiO_3$, Pb(Zr,Ti)$O_3$ (PZT, wherein $0<x<1$), $Pb_{1-x}La_xZr_{1-y}Ti_yO_3$ (PLZT, wherein $0<x<1$, $0<y<1$), $(1-x)Pb(Mg_{1/2}Nb_{2/3})O_{3-x}PbTiO_3$ (PMN-PT, wherein $0<x<1$), hafnia ($HfO_2$), $SrTiO_3$, $SnO_2$, $CeO_2$, MgO, NiO, CaO, ZnO, $ZO_3$ and SiC, or a mixture of two or more of them.

The inorganic particles having lithium-ion transportability may be any one selected from the group consisting of include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($1<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a mixture of two or more of them.

In addition, there is no particular limitation in the average particle diameter of the inorganic particles. However, the inorganic particles preferably have an average particle diameter of 0.001-10 μm in order to form a coating layer with a uniform thickness and to provide suitable porosity. Particularly, the inorganic particles may have an average particle diameter of 100 nm or more, 150 nm or more, or 200 nm or more, and 1000 nm or less, 900 nm or less, 800 nm or less, or 700 nm or less.

[Non-Phenolic Resin]

According to an embodiment of the present disclosure, the porous coating layer may further include a non-phenolic resin as a binder polymer, besides the above-described thermosetting phenolic resin.

The non-phenolic resin may be one used currently for forming a porous coating layer in the art. Particularly, a polymer having a glass transition temperature ($T_g$) of −200 to 200° C. may be used. This is because such a polymer can improve the mechanical properties, such as flexibility and elasticity, of the finally formed porous coating layer. Such a non-phenolic resin functions as a binder which connects and stably fixes the inorganic particles with one another, and thus contributes to prevention of degradation of mechanical properties of a separator having a porous coating layer.

In addition, it is not essentially required for the non-phenolic resin to have ion conductivity. However, when using a polymer having ion conductivity, it is possible to further improve the performance of an electrochemical device. Therefore, a non-phenolic resin having a dielectric constant as high as possible may be used. In fact, since the dissociation degree of a salt in an electrolyte depends on the dielectric constant of the solvent for the electrolyte, a non-phenolic resin having a higher dielectric constant can improve the salt dissociation degree in an electrolyte. The non-phenolic resin may have a dielectric constant ranging from 1.0-100 (measured at a frequency of 1 kHz), particularly 10 or more.

In addition to the above-mentioned function, the non-phenolic resin may be characterized in that it is gelled upon the impregnation with a liquid electrolyte and thus shows a high degree of swelling. Thus, the non-phenolic resin has a solubility parameter (i.e., Hildebrand solubility parameter) of 15-45 $MPa^{1/2}$ or 15-25 $MPa^{1/2}$ and 30-45 $MPa^{1/2}$. Therefore, hydrophilic polymer resins having many polar groups may be used more frequently as compared to hydrophobic polymer resins, such as polyolefins. When the solubility parameter is less than 15 $MPa^{1/2}$ and more than 45 $MPa^{1/2}$, it is difficult for the non-phenolic resin to be swelled with a conventional liquid electrolyte for a battery.

Non-limiting examples of the non-phenolic resin include polyvinylidene fluoride, polyvinylidene fluoride-co-hexafluoropropylene, polyvinylidene fluoride-co-trichloroethylene, polyvinylidene fluoride-co-trifluoroethylene, polyvinylidene fluoride-co-chlorotrifluoroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinylalchol, cyanoethyl cellulose, cyanoethyl sucrose, pullulan, carboxymethyl cellulose, etc.

The separator according to an embodiment of the present disclosure may further include other additives, such as a dispersing agent, as ingredients of the porous coating layer, besides the inorganic particles and a binder polymer.

Although there is no particular limitation in the thickness of the porous coating layer, the porous coating layer may have a thickness of 0.5-20 μm, particularly 1.5-10 μm, based on single-side coating. In addition, the porosity of the porous coating layer is not particularly limited, but the porous coating layer preferably has a porosity of 35-85%.

[Porous Polymer Substrate]

In the separator according to an embodiment of the present disclosure, the porous polymer substrate may be a porous polymer film substrate or a porous polymer nonwoven web substrate.

The porous polymer film substrate may be a porous polymer film including polyolefin, such as polyethylene or polypropylene. For example, such a polyolefin porous polymer film substrate may realize a shut-down function at a temperature of 80-150° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous polymer nonwoven web substrate may be formed of polymers including polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

In addition, although there is no particular limitation in the thickness of the porous polymer substrate, the porous polymer substrate has a thickness of 1-20 μm, particularly 5-15 μm. Although there is no particular limitation in the size of the pores present in the porous polymer substrate and porosity, the pore size and porosity may be 0.01-50 μm and 20-75%, respectively.

Hereinafter, the method for manufacturing a separator according to an embodiment of the present disclosure will be explained in detail. However, the scope of the present disclosure is not limited to the following embodiment.

Particularly, inorganic particles are dispersed in a first solvent, and a thermosetting phenolic resin having at least one hydroxyl group and aromatic ring is dissolved therein to prepare an inorganic particle dispersion (S1).

Herein, the method may further include a step of mixing a polymer solution containing a non-phenolic resin dissolved in a second solvent with the inorganic particle dispersion of step (S1). In addition, the inorganic particle dispersion may further include a dispersing agent.

Herein, the first solvent and the second solvent may be the same or different.

Herein, each of the first solvent and the second solvent preferably has a solubility parameter similar to the solubility parameter of the binder polymers, i.e., the thermosetting phenolic resin and the non-phenolic resin, respectively, and has a low boiling point. This is because such a solvent facilitates homogeneous mixing and the subsequent solvent removal. Non-limiting examples of the solvent that may be used include any one selected from water, C2-C5 alcohols, acetone, tetrahydrofuran, methylene chloride, chloroform, dimethyl formamide, N-methyl-2-pyrrolidone, methyl ethyl ketone and cyclohexane, or a mixture of two or more of them.

Then, slurry for forming a porous coating layer including the inorganic particle dispersion is coated on at least one surface of a porous polymer substrate, followed by drying, to form a porous coating layer (S2).

Although there is no particular limitation in the process for coating the slurry for forming a porous coating layer onto the porous polymer substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, a dip coating process includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous polymer substrate coated with the slurry for forming a porous coating layer is dried by using a dryer, such as an oven, thereby forming a porous coating layer on at least one surface of the porous polymer substrate.

In the porous coating layer, the inorganic particles may be dispersed in the matrix of the binder polymer. The binder polymer may be a thermosetting phenolic resin or a non-phenolic resin, or both.

In addition, the inorganic particles are bound with one another by the binder polymer, while they are packed and are in contact with each other. Thus, interstitial volumes are formed among the inorganic particles, and the interstitial volumes among the inorganic particles become vacant spaces to form pores. In other words, the binder polymer attaches the inorganic particles to one another so that they may retain their binding states. For example, the binder polymer connects and fixes the inorganic particles with one another. In addition, the pores of the porous coating layer are those formed by the interstitial volumes among the inorganic particles, which become vacant spaces. The spaces are defined by the inorganic particles facing one another substantially in a closely packed or densely packed structure of the inorganic particles.

The inorganic particles, the thermosetting phenolic resin, the non-phenolic resin and the porous polymer substrate are the same as described above, and detailed description thereof will be omitted.

In another aspect of the present disclosure, there is provided a lithium secondary battery including a cathode, an anode and a separator interposed between the cathode and the anode, wherein the separator is the above-described separator according to an embodiment of the present disclosure.

Particularly, the lithium secondary battery may include a lithium metal secondary battery, a lithium-ion secondary battery, a lithium polymer secondary battery or a lithium-ion polymer secondary battery.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, aluminum hydroxide $(Al(OH)_3)$ particles (particle size: 800 nm) as inorganic particles were introduced to acetone as a first solvent to a solid content of 30%. Herein, 'solid content' refers to a content of powder obtained after drying the solvent, as expressed by a percentage based on the total content of the solvent and composition of ingredients. Next, isopropyl trioleyl titanate as a dispersing agent and a thermosetting phenolic resin (Kangnam Chemical, resol-type phenol resin, thermosetting temperature: about 150° C., soluble in acetone, solid content 50%, viscosity: 250 mPas at 25° C.) were introduced to the composition as shown in the following Table 1, and agitation was carried out for 2 hours. In this manner, an inorganic particle dispersion including the inorganic particles dispersed in the first solvent and the thermosetting phenolic resin dissolved therein was prepared.

Then, polyvinylidene fluoride-co-hexafluoropropylene (PVDF-HFP) as a non-phenolic resin was introduced to acetone as a second solvent as shown in Table 1, and dissolved therein at 50° C. for about 4 hours to prepare a polymer solution.

The inorganic particle dispersion and the polymer solution prepared as described above were mixed with each other in such a manner that the weight ratio of the inorganic particles to the binder polymer might be 75:25, and the inorganic particles were pulverized and dispersed by using a ball milling process for 3 hours to obtain slurry for forming a porous coating layer having a solid content of 18%.

After that, the slurry for forming a porous coating layer was coated on both surfaces of a polyethylene porous film having a thickness of 9 μm (porosity: 43%, air permeation time: 110 sec/100 mL, resistance: 0.45 ohm) through a coating process at 23° C. under a relative humidity of 45% to a total slurry loading amount of 9.5 g/m$^2$, followed by drying, to obtain a separator having a porous coating layer.

Examples 2-7

The separators were obtained in the same manner as Example 1, except that the types and contents of the ingredients contained in slurry were controlled as shown in Table 1.

Comparative Examples 1-4

The separators were obtained in the same manner as Example 1, except that the types and contents of the ingredients contained in slurry were controlled as shown in Table 1.

[Test Methods]

1) Method for Measuring Thickness

The thickness of a separator was measured by using a thickness gauge (Mitutoyo, VL-50S-B).

2) Method for Measuring Thermosetting Temperature of Thermosetting Phenolic Resin The heat emission peak temperature of a thermosetting phenolic resin measured by using differential scanning calorimeter (DSC) was determined as the thermosetting temperature of the resin.

3) Method for Determining Air Permeability

The air permeability of a separator was determined by using a Gurley type air permeability analyzer according to HS P-8117. Herein, the time required for 100 mL of air to pass through a diameter of 28.6 mm and an area of 645 mm$^2$ was measured.

4) Method for Determining Adhesion between Electrode and Separator (Lami Strength)

Each of the separators according to Examples and Comparative Examples was cut into a size of 25 mm×100 mm. The prepared separator was stacked with an anode, and the resultant stack was inserted between PET films having a thickness 100 μm, and then adhesion was carried out by using a flat press. Herein, the flat press was used under heating and pressurization at 70° C. and a pressure of 600 kgf for 1 second. The adhered separator and anode (artificial graphite, carbon black, carboxymethyl cellulose (CMC) and styrene-butadiene rubber (SBR) at a weight ratio of 96:1:2:2) was attached to slide glass by using a double-sided tape. The end (10 mm or less from the end of the adhesive surface) of the separator adhesive surface was peeled and attached to a 25 mm>100 mm PET film by using a single-sided adhesive

TABLE 1

| | | Inorganic particle dispersion (parts by weight) | | | | Binder polymer solution (parts by weight) | |
|---|---|---|---|---|---|---|---|
| | | Inorganic particles | Polymer dispersing agent (Cyano-ethyl PVA) | Dispersing agent (Ti-based coupling agent) | Themosetting phenolic resin | Fluorinated binder polymer (non-phenolic resin) | Polyvinyl acetate binder polymer (non-phenolic resin) |
| Comp. Ex. | 1 | 75 | 0.75 | 0.75 | 0 | 23.5 | 0 |
| | 2 | | 1.5 | 0 | 0 | 23.5 | 0 |
| | 3 | | 0 | 1.5 | 0 | 23.5 | 0 |
| | 4 | | 0.75 | 0.75 | 0 | 5 | 18.5 |
| Ex. | 1 | 75 | 0 | 0.75 | 0.75 | 23.5 | 0 |
| | 2 | | 0 | 0 | 1.5 | 23.5 | 0 |
| | 3 | | 0 | 0 | 3 | 22 | 0 |
| | 4 | | 0 | 0 | 5.25 | 19.75 | 0 |
| | 5 | | 0 | 0 | 7.5 | 17.5 | 0 |
| | 6 | 70 | 0 | 0 | 7 | 23 | 0 |
| | 7 | 75 | 0 | 0 | 1.5 | 5 | 18.5 |

| | | Physical properties of slurry | | | | Physical properties of separator | | |
|---|---|---|---|---|---|---|---|---|
| | | Sedimentation rate (um/sec) | $D_{50}$ (um) | Thickness | Loading amount | Air permeability | Adhesion between electrode and separator (Lami, gf/25 mm) (Top/Bottom) | Heat shrinkage (MD/TD) |
| Comp. Ex. | 1 | 10.8 | 1.8 | 18.0 | 9.5 | 284 | 77/75 | 38/38 |
| | 2 | 22.5 | 3.1 | 17.4 | 9.4 | 302 | 54/69 | 35/34 |
| | 3 | 12.5 | 1.8 | 17.8 | 9.4 | 269 | 57/61 | 41/40 |
| | 4 | 8.9 | 1.5 | 16.8 | 9.2 | 278 | 100/98 | 47/46 |
| Ex. | 1 | 10.5 | 2.0 | 18.1 | 9.6 | 252 | 75/79 | 27/26 |
| | 2 | 20.1 | 2.6 | 17.9 | 9.4 | 249 | 78/72 | 23/23 |
| | 3 | 17.2 | 2.3 | 17.5 | 9.5 | 234 | 66/69 | 20/19 |
| | 4 | 16.1 | 2.1 | 17.8 | 9.3 | 219 | 62/65 | 17/16 |
| | 5 | 12.5 | 1.9 | 17.4 | 9.2 | 203 | 58/56 | 12/12 |
| | 6 | 11.3 | 2.3 | 17.6 | 9.5 | 254 | 81/84 | 16/16 |
| | 7 | 13.4 | 1.8 | 16.7 | 9.4 | 267 | 91/104 | 22/21 | tape so that they might be connected with each other in the longitudinal direction. Then, the slide glass was mounted to the lower holder of a UTM instrument (LLOYD Instrument LF Plus), the PET film adhered to the separator was mounted to the upper holder of the UTM instrument, and the force required for separating the anode from the porous coating layer facing the anode was determined by applying force at an angle of 180° at a rate of 300 mm/min.

5) Determination of Heat Shrinkage

The heat shrinkage was calculated according to the formula of (Initial length−Length after heat shrinking at 150° C. for 30 minutes)/(Initial length)×100.

What is claimed is:

1. A separator for a lithium secondary battery, comprising:
a porous polymer substrate having a plurality of pores; and
a porous coating layer on at least one surface of the porous polymer substrate,
wherein the porous coating layer comprises a plurality of inorganic particles and a binder polymer,
wherein the binder polymer comprises a thermosetting phenolic resin having at least one hydroxyl group and at least one aromatic group, and
wherein the thermosetting phenolic resin is configured to be thermally cured at 120° C. to 200° C. in the separator to form a network structure.

2. The separator for a lithium secondary battery according to claim 1, wherein the thermosetting phenolic resin comprises at least one of a novolac-containing phenol resin represented by Chemical Formula 1 and a resol-containing phenol resin represented by Chemical Formula 2:

[Chemical Formula 1]

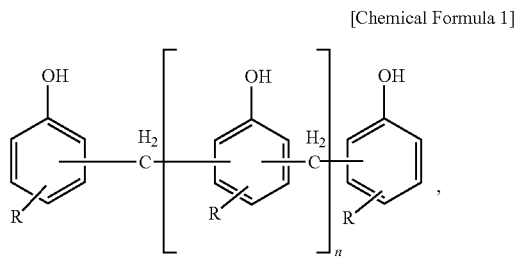

wherein n is an integer of 1 or more, and R represents any one of H, $C_1$-$C_{100}$ alkyl, alkoxy and alkenyl groups,
wherein the $C_1$-$C_{100}$ alkyl, alkoxy and alkenyl groups are optionally substituted,

[Chemical Formula 2]

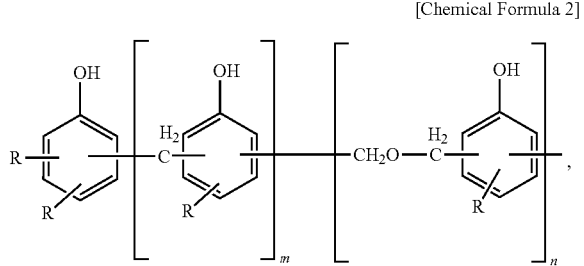

wherein each of n and m is an integer of 1 or more, and R represents any one of H, $C_1$-$C_{100}$ alkyl, alkoxy and alkenyl groups,
wherein the $C_1$-$C_{100}$ alkyl, alkoxy and alkenyl groups are optionally substituted.

3. The separator for a lithium secondary battery according to claim 2, wherein an amount of the thermosetting phenolic resin is 0.1 wt % to 20 wt % based on 100 wt % of an amount of the inorganic particles.

4. The separator for a lithium secondary battery according to claim 1, wherein the thermosetting phenolic resin is a phenol-formaldehyde resin.

5. The separator for a lithium secondary battery according to claim 1, wherein an amount of the thermosetting phenolic resin is 0.1 wt % to 20 wt % based on 100 wt % of an amount of the inorganic particles.

6. The separator for a lithium secondary battery according to claim 1, wherein the binder polymer further comprises a non-phenolic resin in an amount of 0.1 wt % to 50 wt % based on 100 wt % of an amount of the inorganic particles.

7. The separator for a lithium secondary battery according to claim 1, wherein the porous polymer substrate has a thickness of 1 μm to 20 μm, and the thickness of the porous coating layer is 0.5 μm to 20 μm based on single surface coating.

8. A lithium secondary battery comprising:
a cathode,
an anode, and
a separator interposed between the cathode and the anode, wherein the separator is the same as defined in claim 1.

9. A method for manufacturing a separator for a lithium secondary battery, comprising the steps of:
(S1) preparing an inorganic particle dispersion by dispersing inorganic particles in a first solvent, and dissolving a thermosetting phenolic resin having at least one hydroxyl group and at least one aromatic ring in the inorganic particle dispersion to form a slurry; and
(S2) coating the slurry comprising the inorganic particle dispersion on at least one surface of a porous polymer substrate, and drying the slurry after coating to form a porous coating layer,
wherein the thermosetting phenolic resin is configured to be thermally cured at 120° C. to 200° C. in the separator to form a network structure.

10. The method for manufacturing the separator for the lithium secondary battery according to claim 9, which further comprises a step of mixing the inorganic particle dispersion of step (S1) with a polymer solution comprising a non-phenolic resin dissolved in a second solvent before step (S2).

11. The method for manufacturing the separator for the lithium secondary battery according to claim 10, wherein each of the first solvent and the second solvent independently comprises at least one selected from the group consisting of water, $C_2$-$C_5$ alcohols, acetone, tetrahydrofuran, methylene chloride, chloroform, dimethyl formamide, N-methyl-2-pyrrolidone, methyl ethyl ketone and cyclohexane.

12. The method for manufacturing the separator for the lithium secondary battery according to claim 9, wherein the inorganic particle dispersion further comprises a dispersing agent.

13. The method for manufacturing the separator for the lithium secondary battery according to claim 9, wherein the thermosetting phenolic resin comprises at least one of a novolac-containing phenol resin represented by Chemical Formula 1 and a resol-containing phenol resin represented by Chemical Formula 2:

[Chemical Formula 1]

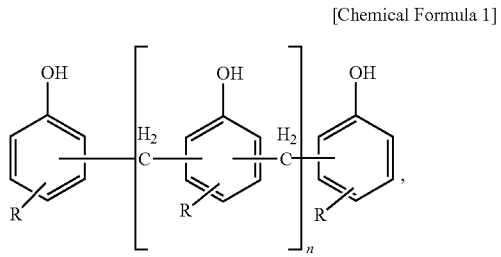

wherein n is an integer of 1 or more, and R represents any one of H, $C_1$-$C_{100}$ alkyl, alkoxy and alkenyl groups, wherein the $C_1$-$C_{100}$ alkyl, alkoxy and alkenyl groups are optionally substituted,

[Chemical Formula 2]

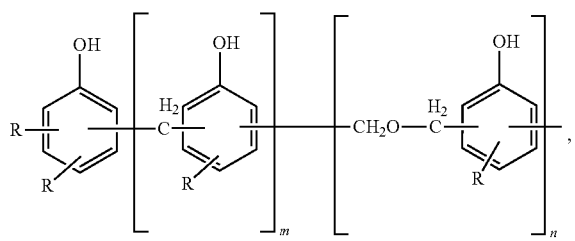

wherein each of n and m is an integer of 1 or more, and R represents any one of H, $C_1$-$C_{100}$ alkyl, alkoxy and alkenyl groups, wherein the $C_1$-$C_{100}$ alkyl, alkoxy and alkenyl groups are optionally substituted.

14. The method for manufacturing the separator for the lithium secondary battery according to claim 13, wherein an amount of the thermosetting phenolic resin is 0.1 wt % to 20 wt % based on 100 wt % of an amount of the inorganic particles.

15. The method for manufacturing the separator for the lithium secondary battery according to claim 9, wherein an amount of the thermosetting phenolic resin is 0.1 wt % to 20 wt % based on 100 wt % of an amount of the inorganic particles.

* * * * *